(12) United States Patent
Pacher et al.

(10) Patent No.: US 11,362,462 B2
(45) Date of Patent: Jun. 14, 2022

(54) ROTATABLE INTERFACE ASSEMBLY FOR AN ELECTRICAL CONNECTOR

(71) Applicant: Aptiv Technologies Limited, St. Michael (BB)

(72) Inventors: Franz Pacher, Roth (DE); Reinhard Hinteregger, Bad Kleinkirchheim (DE); Prasanna Ramakrishnan, Tamilnadu (IN)

(73) Assignee: APTIV TECHNOLOGIES LIMITED

( * ) Notice: Subject to any disclaimer, the term of this patent is extended or adjusted under 35 U.S.C. 154(b) by 0 days.

(21) Appl. No.: 17/114,856

(22) Filed: Dec. 8, 2020

(65) Prior Publication Data

US 2021/0210904 A1 Jul. 8, 2021

(30) Foreign Application Priority Data

Jan. 7, 2020 (EP) ..................................... 20150509

(51) Int. Cl.
*H01R 13/64* (2006.01)
*B60L 53/16* (2019.01)
(Continued)

(52) U.S. Cl.
CPC .............. *H01R 13/64* (2013.01); *B60L 53/16* (2019.02); *H01R 13/506* (2013.01);
(Continued)

(58) Field of Classification Search
CPC .............. H01R 13/506; H01R 13/5205; H01R 13/629; H01R 13/64; H01R 2201/26; B60L 53/16
See application file for complete search history.

(56) References Cited

U.S. PATENT DOCUMENTS

2016/0043509 A1* 2/2016 Reeves .............. H01R 13/6582
439/374
2017/0279103 A1* 9/2017 Wisniewski ......... H01R 13/629

FOREIGN PATENT DOCUMENTS

DE 102018112222 A1 11/2019

OTHER PUBLICATIONS

Extended European Search Report for EP Application No. 20150509.6, dated Jul. 13, 2020, 9 pages.

* cited by examiner

*Primary Examiner* — Oscar C Jimenez
(74) *Attorney, Agent, or Firm* — Billion & Armitage

(57) ABSTRACT

A rotatable interface assembly for an electrical connector, an electrical connector, a connector system, and a method for coupling the system is presented herein. The rotatable interface assembly includes a connector component, having an electrical contact for electrically connecting electrical elements via a corresponding counter connector. The rotatable interface assembly further includes a base part and a rotatable part. The base part at least partially houses the connector component and has a securing means for being secured to a fixed counterpart. The rotatable part being configured to receive the corresponding counter connector at least partially under a specific angular orientation. The rotatable part is arranged on the base part, so as to be rotatable around a rotational axis relative to the base part. The rotatable part can be rotated around the rotational axis in a desired angular orientation that matches an orientation of a corresponding counter connector, to allow to receive the corresponding counter connector under different angular orientations, relative to the base part.

21 Claims, 7 Drawing Sheets

(51) Int. Cl.
*H01R 13/506* (2006.01)
*H01R 13/52* (2006.01)
*H01R 13/629* (2006.01)
*H01R 35/00* (2006.01)

(52) U.S. Cl.
CPC ....... *H01R 13/5205* (2013.01); *H01R 13/629* (2013.01); *H01R 35/00* (2013.01); *H01R 2201/26* (2013.01)

ROTATABLE INTERFACE ASSEMBLY FOR AN ELECTRICAL CONNECTOR

CROSS-REFERENCE TO RELATED APPLICATION

This application claims benefit of priority to European Patent Application No. 20150509.6 filed in the European Patent Office on Jan. 7, 2020, the entire disclosure of which is hereby incorporated by reference.

TECHNICAL FIELD

The invention relates to the field of rotatable interface assemblies for electrical connectors. Further, the invention relates to an electrical connector including a rotatable interface assembly and a connector system including the electrical connector and a method for coupling the connector system. An electrical connector according to the invention, is typically used in vehicles, particularly in the vehicle electrical system.

BACKGROUND

During vehicle operation, different electrical consumers, such as e.g. an ignition and fuel-injection system, control units, safety and comfort and convenience electronics, infotainment systems, lighting, and/or other equipment, must be supplied with power. For powering the electrical consumers, these must be connected to a power source, such as a vehicle's battery.

A vehicle electrical system, which may be a closed circuit, connects the single electrical consumers to the respective power source(s) of the vehicle, and thus powers the respective consumers. The consumers and the power source(s) of the vehicle electrical system are typically connected via at least one cable harness. At an electrical interface between two components of the vehicle electrical system (i.e. a consumer, a power source, a cable and/or a cable harness) electrical connectors are typically provided.

Conventional vehicle electrical systems operate at 12 volts. However, there is a trend to vehicle electrical systems running at higher voltages, such as 42 volts or 48 volts. These higher voltage vehicle electrical systems can be provided instead of or in addition to the conventional vehicle electrical systems that operate at 12V.

Those higher voltage vehicle electrical systems allow to provide more power, compared to conventional 12-volt systems. This is, as e.g. a wire of a given size can carry four times as much power at 48 volts as at 12 volts at the same current (amps).

Thus, higher voltage vehicle electrical systems allow for lighter cable harnesses, as more power can be transmitted, at a given wire size. Further, the increasing power demand of the vehicle's electrical consumers can be satisfied by establishing higher voltage vehicle electrical systems, as more power can be transferred.

While conventional 12V-systems may still be used for conventional lighting and infotainment, higher voltage vehicle electrical systems may be used for powering more energy consuming components, such as electrically driven turbochargers, air conditioning, electrical starting assistance systems, and the like. Further, higher voltage vehicle electrical systems allow for a facilitated recuperation of energy during braking, thereby reducing fuel consumption and $CO_2$ emissions.

However, with increasing voltage and higher power transmission, the requirements for the electrical interface between two components of the vehicle electrical system increase, i.e. the requirements for electrical connectors and connector systems, respectively.

These increased requirements lead inter alia to increased dimensions of the connectors. To compensate for increased dimensions, the electrical connectors for higher voltage vehicle electrical systems are often configured to the available construction space. For example, angled connectors are frequently used. For mating a configured connector with a respective counter connector, the counter connector must also be configured. For example, if a connector can only be installed under a certain angular orientation, the orientation of the corresponding counter connector must match with the angular orientation of the connector. This leads to a high variety of variants of the respective connectors and likewise to an increased risk of incorrect installation of the connectors/counter connectors. Further, costs are increased. Thus, there is a need in the art to overcome the drawbacks described above.

BRIEF SUMMARY

The drawbacks described above are at least partially overcome by a rotatable interface assembly, an electrical connector, an electrical connector system and a method for coupling the electrical connector system as described in detail below.

Particularly, these drawbacks are at least partially overcome by a rotatable interface assembly for an electrical connector comprising a connector component. The connector component includes at least one electrical contact for electrically connecting electrical elements, particularly electrical elements of a vehicle electrical system, via a corresponding counter connector. The rotatable interface assembly comprises a base part that at least partially houses the connector component. The base part further comprises at least one securing means for being secured to a fixed counterpart. Further, the rotatable interface assembly comprises a rotatable part, being configured to receive the corresponding counter connector at least partially under a specific angular orientation. The rotatable part is arranged on the base part, so as to be rotatable around a rotational axis relative to the base part, wherein the rotatable part can be rotated around the rotational axis in a desired angular orientation that matches an orientation of the corresponding counter connector, so as to allow to receive the corresponding counter connector under different angular orientations, relative to the base part.

The connector component may be a male or a female connector, comprising at least one, typically at least two electrical contacts, for electrically connecting electrical elements, such as electrical elements of a vehicle electrical system. If there are more than two electrical contacts the connector may be used additionally for signaling purposes. The electrical elements may be an electrical consumer, a power source, a cable and/or a cable harness. Particularly, the connector component is configured to be used in a higher voltage vehicle electrical system, such as a 48 volts vehicle electrical system. Further, the connector component may be configured to transmit electrical power of at least 10 kW and most preferably of at least 20 kW.

The securing means allows to secure the base part on a counterpart. The securing may be torque-proof. Particularly, the securing means may be formed as a (threaded) through hole that is configured to receive a further securing element such as a screw or a bolt, for securing the base part to a counterpart. Alternatively, the securing means may be formed as a latch that allows for a fast and cost-effective securing. The counterpart may be a structure of a vehicle, a vehicle's battery and/or an electrical consumer.

As the rotatable part is configured to receive the corresponding counter connector at least partially under a specific angular orientation, the electrical connector comprising the rotatable interface assembly and/or the rotatable interface assembly can be configured to a corresponding counter connector, thereby saving construction space. For example, the rotatable part may comprise a lateral opening that may serve as a cable guide for a cable of an angular counter connector, when the angular counter connector is coupled to the rotatable interface assembly/the electrical connector. Alternatively, the lateral opening may guide a housing portion of the corresponding counter connector. This lateral opening allows to receive the corresponding counter connector only under a specific angular orientation; however, it allows to save construction space after coupling the connectors. Further, as the rotatable part is configured to receive the corresponding counter connector at least partially under a specific angular orientation, only the rotatable part and not the electrical connector, as a whole, is to be configured to the design of the corresponding counter connector.

Particularly, by providing a rotatable interface assembly having a base part and a rotatable part that is arranged on the base part, the angular orientation of the rotatable interface assembly for receiving a corresponding counter connector can be configured, after the rotatable interface assembly and/or an electrical connector comprising the rotatable interface assembly is installed, e.g. in a vehicle. This is achieved by arranging the rotatable part rotatably on the base part around a rotational axis. Thus, while the base part may be secured to the counterpart, the angular orientation of the rotatable part can still be configured, by rotating the rotatable part respectively. Accordingly, the rotatable part can be rotated into a desired angular orientation that matches an orientation of the corresponding counter connector, to allow to receive the corresponding counter connector under different angular orientations, relative to the base part. Thus, by rotating the rotatable part, the rotatable interface assembly can be configured to the design/orientation of the corresponding counter connector, even after the rotatable interface assembly and/or the electrical connector comprising the rotatable interface assembly is installed.

Therefore, different variants of an electrical connector, providing different angular orientations of the electrical connector, are no longer needed, and can be replaced by a single electrical connector that includes a rotatable interface assembly, as described above. To achieve different angular orientations, the rotatable part can be rotated accordingly. This also reduces the risk of incorrect installation of the electrical connector and avoids excessive cable bending during assembly, as the orientation can be configured after the electrical connector/the rotatable interface assembly is installed. All in all, the rotatable interface assembly allows for reduced costs and a facilitated installation and assembly of a respective connector system, as will be described in greater detail below.

The rotatable part may be rotatable around 360° around the rotational axis. Particularly, the rotation can be clockwise and/or counterclockwise. Thus, the rotatable interface assembly and/or an electrical connector comprising the rotatable interface assembly can be configured to the design/orientation of the corresponding counter connector easily, thereby saving costs and reducing failures during installation.

Further, the base part may comprise at least one latching element and the rotatable part may comprise at least one corresponding latching element. The latching element may be configured to latch with the corresponding latching element to secure the rotatable part on the base part in an axial direction of the rotational axis. The latching connection achieved by the latching element and the corresponding latching element allows for a facilitated assembling of the rotatable interface assembly. For latching the base part with the rotatable part, the rotatable part may be plugged onto the base part and pushed until the latching connection is achieved. Thus, assembling the rotatable interface assembly may be tool-free. Further, upon latching, a user may receive a feedback, such as a haptic, acoustic and/or optical feedback indicating the correct latching of the latching element with a corresponding latching element.

The at least one latching element may be a latching protrusion, extending radially outward, wherein the latching protrusion optionally may be formed as circumferential edge portion on an outer circumferential surface of the base part. Particularly, the circumferential edge portion may optionally surround the base part completely. This allows for a latching of the rotatable part to the base part under different angular orientations. Particularly, the latching element may be a revolved protruding latching element that protrudes circumferentially, and the rotatable part may comprise four corresponding latching elements.

Further, the at least one corresponding latching element may extend radially inward, from an inner circumferential surface of the rotatable part and the at least one corresponding latching element optionally may be formed as a latching nose. By providing the corresponding latching element on an inner circumferential surface of the rotatable part and the latching element on an outer circumferential surface of the base part, the latching connection is sandwiched between the base part and the rotatable part and therefore protected. Thus, a reliable latching connection can be provided.

Further, the rotatable part may comprise multiple corresponding latching elements. Optionally, these multiple corresponding latching elements may be equally distributed in the circumferential direction. Thus, the latching connection is provided redundantly and therefore reliability can be increased. Further, by providing multiple (small) corresponding latching elements instead of few (big) corresponding latching elements, the latching can be facilitated, as the coupling force for achieving the latching may be minimized. For example, the rotatable part may comprise at least four corresponding latching elements, preferably at least six corresponding latching elements, and more preferably at least eight corresponding latching elements. Further, the base part may comprise multiple locking elements, being circumferentially distributed on the base part and the rotatable part may comprise at least one corresponding flexible locking element that is configured to engage with at least one of the multiple locking elements, for releasably locking the rotatable part in the desired angular orientation, relative to the base part. Alternatively, the rotatable part may comprise multiple locking elements, being circumferentially distributed on the rotatable part and the base part may comprise at least one flexible locking element that is configured to engage with at least one of the multiple locking elements, for releasably locking the rotatable part in a desired angular orientation, relative to the base part.

This locking allows to releasably lock the rotatable part in a desired angular orientation, and thus facilitates the coupling of the corresponding counter connector. For example, the rotatable part can be rotated and locked in the desired angular orientation. Thus, the desired angular orientation will be maintained (as long as the rotatable part is not actively rotated again). Then, the corresponding counter connector can be plugged (coupled) to the rotatable interface assembly and/or an electrical connector comprising the rotatable interface assembly, and it is guaranteed that the angular orientation of the rotatable part and the orientation of the corresponding counter connector match, already prior to the coupling.

The multiple locking elements may be provided as locking grooves that are substantially parallel to the rotational axis and optionally the at least one corresponding flexible locking element may be provided as a corresponding at least one locking rib. The engagement of a locking rib with a respective locking groove allows for a secure locking. To provide a releasable locking and to allow the rotatable part to be rotated and locked multiple times, without damaging the locking elements and/or the at least one corresponding flexible locking element, the height and angle of the flanks of the grooves and/or the rib may be adjusted accordingly.

The base part or the rotatable part may comprise at least three corresponding flexible locking elements and even more preferably at least five corresponding flexible locking elements. The more corresponding flexible locking elements are provided, the tighter is the locking, and thus a more secure locking is provided.

Further, the base part or the rotatable part may comprise at least six, preferably at last 12, more preferably at least 24, even more preferably at least 36 and most preferably at least 72 locking elements. The locking elements may be equally circumferentially distributed on the base part or on the rotatable part, to allow a releasable locking of the rotatable part in a desired angular orientation relative to the base part. The number of equally circumferentially distributed locking elements gives a minimum rotation angle $\alpha$. For example, when providing six locking elements, the rotatable part can be locked every 60°. Accordingly, the rotatable part can be locked in steps of 30°, 15°, 10° or 5°, respectively, when 12, 24, 36 or 72 locking elements are provided.

The base part may comprise a guiding surface and the rotatable part may comprise a corresponding guiding surface, wherein the corresponding guiding surface may be configured to slide along the guiding surface upon rotational movement of the rotatable part, so as to support the rotational movement of the rotatable part. This support allows for a precise rotational movement and prevents undesired tilting and/or sticking of the rotatable part.

For example, the guiding surface may be provided on an outer circumferential surface of a cylindrical portion of the base part, wherein the corresponding guiding surface may be provided on an inner circumferential surface of a cylindrical shroud portion of the rotational part. Additionally, or alternatively, a guiding surface of the base part may be provided on an inner circumferential surface of a cylindrical portion of the base part. The guiding surface may be interrupted by the locking elements of the base part. In this embodiment, a corresponding guiding surface of the rotatable part may be a radially outwardly oriented surface of a cylindrical portion or of an arc-shaped portion of the rotatable part.

The rotatable interface assembly may further comprise a sealing member, for sealing the rotatable interface assembly against a corresponding counter connector, when being coupled to a corresponding counter connector. Additionally, or alternatively the rotatable interface assembly may comprise a sealing face that is configured to engage with a sealing member of a corresponding counter connector, to seal the rotatable interface assembly against a corresponding counter connector. Thus, the rotatable interface assembly and/or an electrical connector comprising the rotatable interface assembly can be used in harsh environments, such as an engine compartment, and is protected from moisture, dust, and the like.

The rotatable interface assembly may further comprise a coupling means for coupling a corresponding counter connector to the rotatable interface assembly by means of a corresponding coupling means provided on the corresponding counter connector, wherein the coupling means optionally may be arranged on the rotatable part. The coupling means may be configured, when being coupled to the corresponding coupling means, to secure the coupling between the rotatable interface assembly and the corresponding counter connector. Thus, loosening of the coupling can be prevented and an electrical connection can be maintained.

The above described drawbacks are further at least partially overcome by an electrical connector, comprising the rotatable interface assembly, as described above, and a connector housing that houses the at least one electrical contact at least partly.

The above described drawbacks are further at least partially overcome by an electrical connector system comprising the electrical connector, as described above, and a corresponding counter connector. The corresponding counter connector is configured to be received at least partially within the rotatable part of the rotatable interface assembly of the electrical connector, so as to couple with the electrical connector for connecting electrical elements, particularly electrical elements of a vehicle electrical system, wherein the corresponding counter connector optionally may comprise one of an angled connector and a female connector. With the electrical connector system all advantageous described above can be achieved.

The described drawbacks are further at least partially overcome a method for coupling the connector system. With this method all advantageous described above can be achieved. The method comprises the steps of:
providing an electrical connector,
providing a corresponding counter connector,
rotating the rotatable part of the rotatable interface assembly of the electrical connector, to be in a desired angular orientation that matches the orientation of the corresponding counter connector, and
coupling the corresponding counter connector with electrical connector.

BRIEF DESCRIPTION OF THE DRAWINGS

The present invention will now be described, by way of example with reference to the accompanying drawings, in which.

DETAILED DESCRIPTION

The following description sets forth in detail certain illustrative aspects of the apparatus and the method briefly described above. These aspects are indicative, however, of but a few of the various ways in which the principles of various embodiments can be employed and the described embodiments are intended to include all such aspects and their equivalent.

Figure 1:
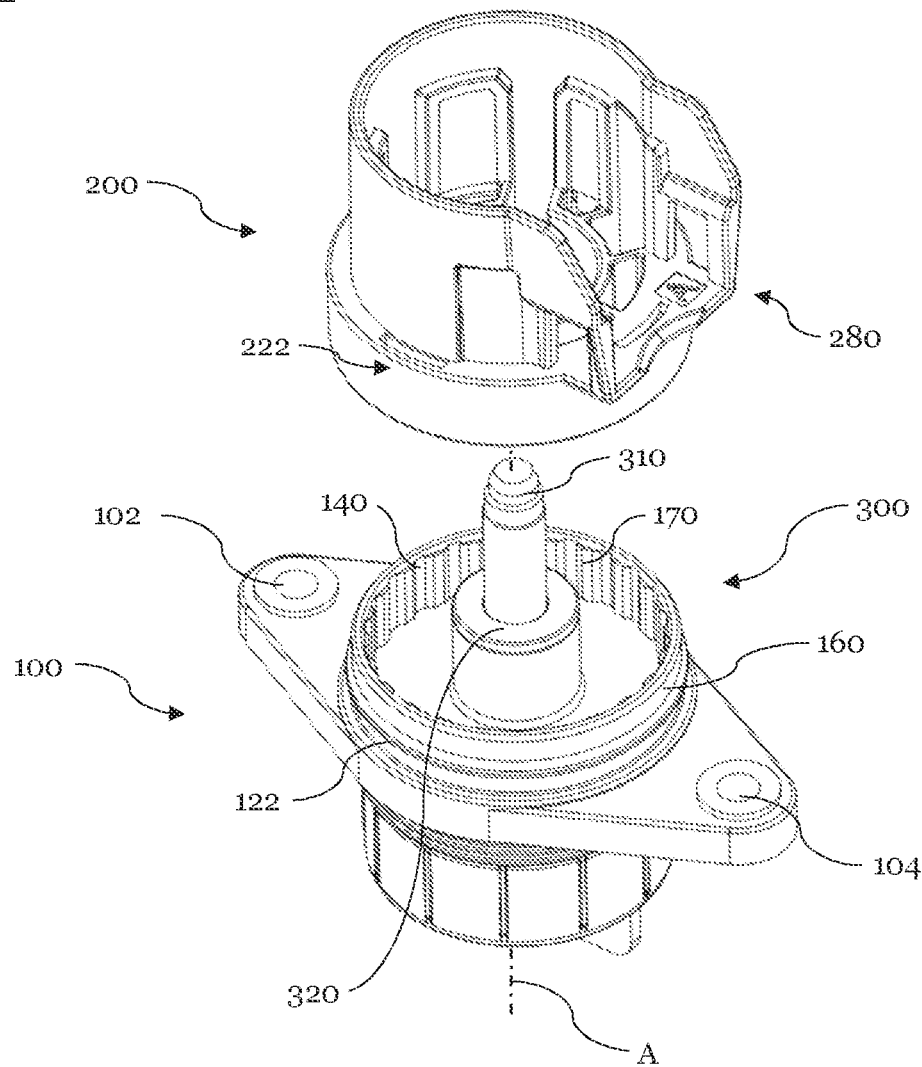
FIG. 1 schematically shows a rotatable interface assembly, in an exploded view in accordance with an embodiment.

FIG. 1 shows a rotatable interface assembly 10 in an exploded view. The rotatable interface assembly 10 comprises a base part 100 and a rotatable part 200. Further, the rotatable interface assembly 10 comprises a connector component 300. The connector component 300 is at least partially housed in the base part 100.

The connector component 300 comprises a first electrical contact 310 and optionally a second electrical contact 320 for electrically connecting electrical elements, particularly electrical elements of a vehicle electrical system, via a corresponding counter connector (not shown). The connector component 300 and therefore the electrical connector assembly 10 may be adapted to be used in a higher voltage vehicle electrical system, such as a 48 volts vehicle electrical system.

The base part 100 comprises at least one securing means being formed as a through hole 102, 104. In the embodiment illustrated in FIG. 1, two through holes are present. Each of the through holes 102, 104 serves for receiving a further securing element, such as a screw or a bolt, for securing the base part 100 to a counterpart (not shown).

The rotatable part 200 is configured to receive a corresponding counter connector at least partially under a specific angular orientation. Specifically, the rotatable part 200 may comprise a lateral opening 280 that may serve as cable guide for a cable of an angular counter connector or for guiding a housing portion of a corresponding counter connector, when the angular counter connector is coupled to the rotatable interface assembly 10. This lateral opening 280 allows to receive the corresponding counter connector only under a specific angular orientation, and further allows to save construction space after coupling the connectors.

The rotatable part 200 can be arranged on the base part 100 (see FIG. 2), to be rotatable around a rotational axis A relative to the base part 100. The base part 100 may comprise a latching element 122, that may be formed as a circumferential edge portion that optionally surrounds the base part 100 completely. The rotatable part 200 may comprise at least one and preferably four corresponding latching elements 222. The latching element 122 may be configured to latch with the corresponding latching element 222 to secure the rotatable part 200 on the base part 100 in an axial direction of the rotational axis A.

Figure 4A:
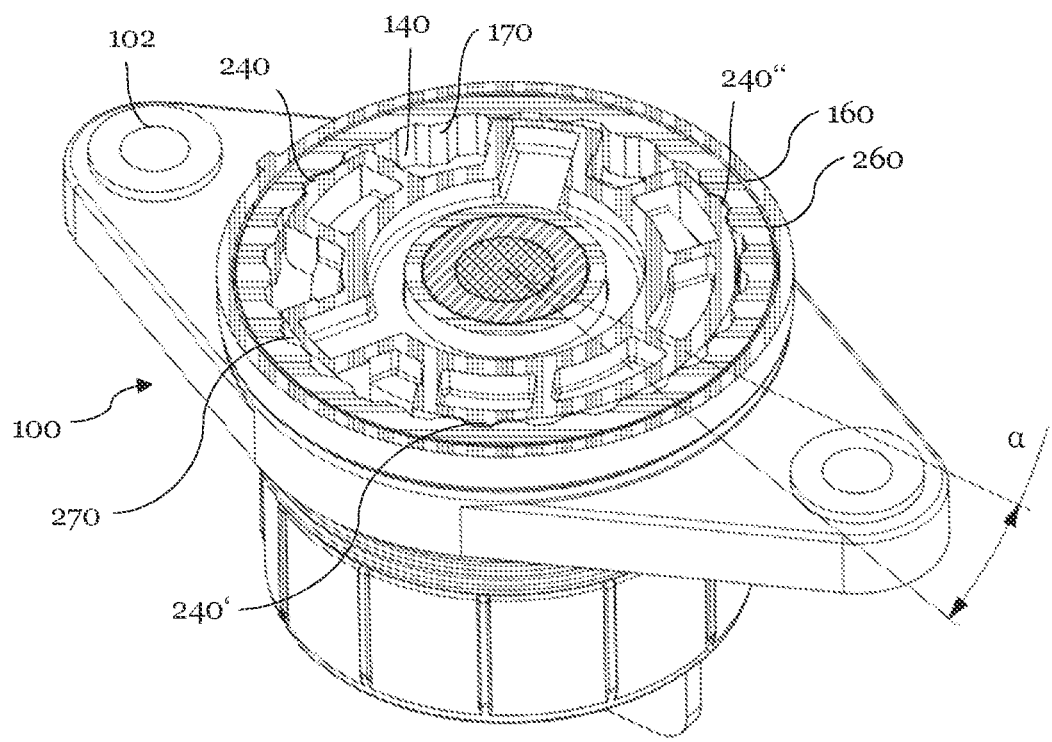
FIG. 4A schematically shows the rotatable interface assembly (rotational feature) of FIG. 2, in a cross-section view in accordance with an embodiment.
Figure 4B:
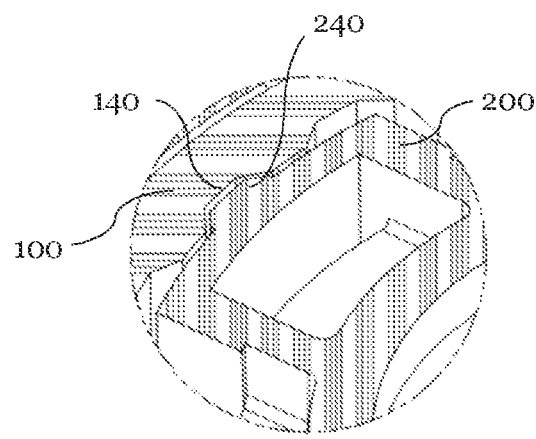
FIG. 4B schematically shows a detail of a locking element in accordance with an embodiment.

Further, the base part 100 may comprise multiple locking elements 140 that are described in greater detail with respect to FIGS. 4A and 4B. The base part 100 may further comprise a guiding surface 160, being provided on an outer circumferential surface of a cylindrical portion of the base part 100 and/or a guiding surface 170 being provided on an inner circumferential surface of a cylindrical portion of the base part 100. The guiding surface 170 may be interrupted by the locking elements 140 of the base part 100.

Figure 2:
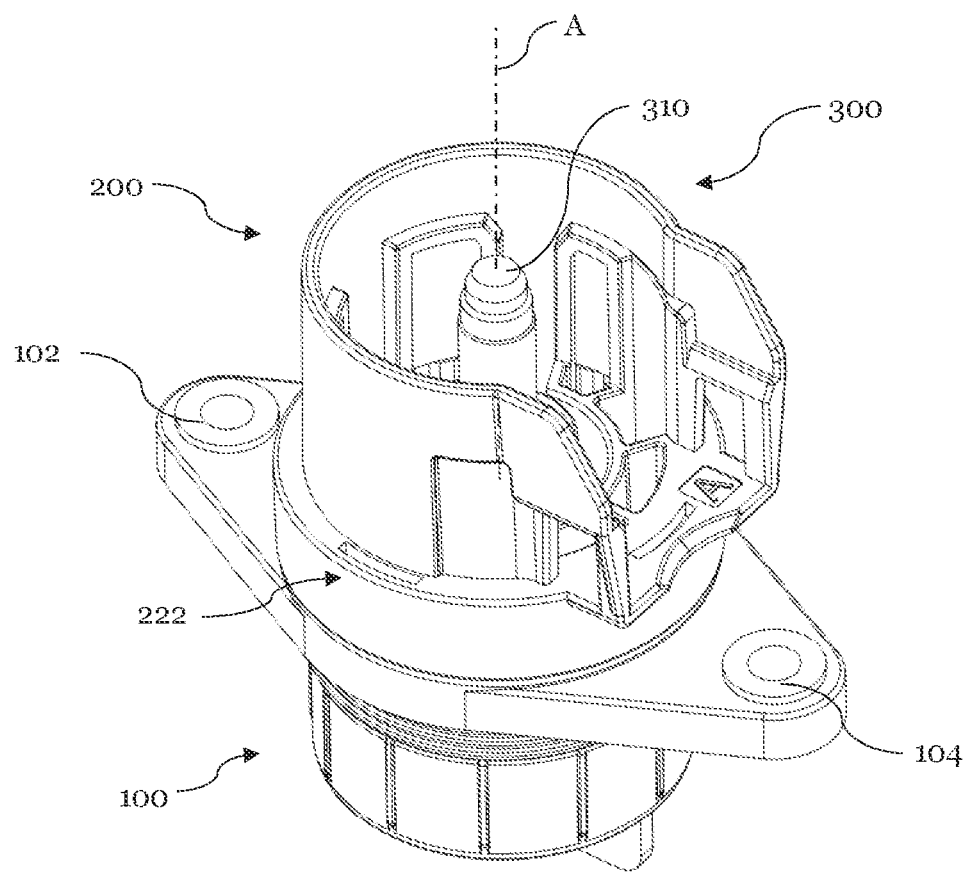
FIG. 2 schematically shows the rotatable interface assembly of FIG. 1, in an assembled state in accordance with an embodiment.

FIG. 2 shows the rotatable interface assembly 10 in an assembled state. Here, the rotatable part 200 is arranged on the base part 100 and can be rotated around the rotational axis A in a desired angular orientation that matches an orientation of a corresponding counter connector (not shown), so as to allow to receive the corresponding counter connector under different angular orientations, relative to the base part 100.

Figure 3:
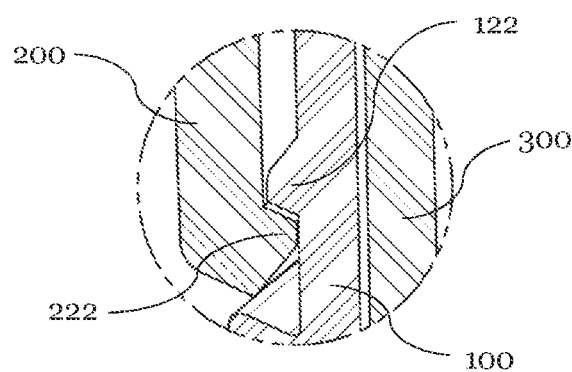
FIG. 3 schematically shows a detail of a latching connection in accordance with an embodiment.

As shown in FIG. 3, the rotatable part 200 may be latched to the base part 100 by means of a corresponding latching element 222 that latches with a latching element 122 of the base part 100. The latching element 122 may extend radially outward from an outer circumferential surface of the base part 100. Accordingly, the corresponding latching element 222 may extend radially inward from an inner circumferential surface of the rotatable part 200. By providing the corresponding latching element 222 on an inner circumferential surface of the rotatable part 200 and the latching element 122 on an outer circumferential surface of the base part 100, the latching connection is sandwiched between the base part 100 and the rotatable part 200 and therefore protected.

FIG. 4A shows the rotatable interface assembly 10 of FIG. 2, in a cut view. The base part 100 may comprise a guiding surface 160 that is provided on an outer circumferential surface of a cylindrical portion of the base part 100. The rotatable part 200 may comprise a corresponding guiding surface 260 which may be provided on an inner circumferential surface of a cylindrical shroud portion of the rotational part 200. Additionally, or alternatively, a guiding surface 170 of the base part may be provided on an inner circumferential surface of a cylindrical portion of the base part 100. The guiding surface may be interrupted by multiple locking elements 140 of the base part 100. Further, a corresponding guiding surface 270 of the rotatable part 200 may be a radially outwardly oriented surface of an arc-shaped portion of the rotatable part 200. The corresponding guiding surface(s) 260, 270 may be configured to slide along the respective guiding surface(s) 160, 170 upon rotational movement of the rotatable part 200, to support the rotational movement of the rotatable part 200. This support allows for a precise rotational movement and prevents undesired tilting and/or sticking of the rotatable part 200.

Further the base part 100 may comprise multiple locking elements 140 that may be formed as locking grooves that are substantially parallel to the rotational axis. The rotatable part 200 comprises in the embodiment shown in FIG. 4A at least three corresponding flexible locking elements 240, 240', 240" that may be formed as corresponding locking ribs. The engagement of a locking groove, being one of multiple locking elements 140 of the base part, with a locking rib (corresponding flexible locking element 240) of the rotatable part 200 is shown in detail in FIG. 4B.

In the embodiment shown in FIG. 4A, the base part comprises 24 locking elements 140 that are equally circumferentially distributed on the base part and allow a releasable locking of the rotatable part 200 in a desired angular orientation γ relative to the base part 100. The number of equally circumferentially distributed locking elements 140 defines a minimum rotation angle α. In the embodiment of FIG. 4A, α is equal to 15°.

Figure 5A:
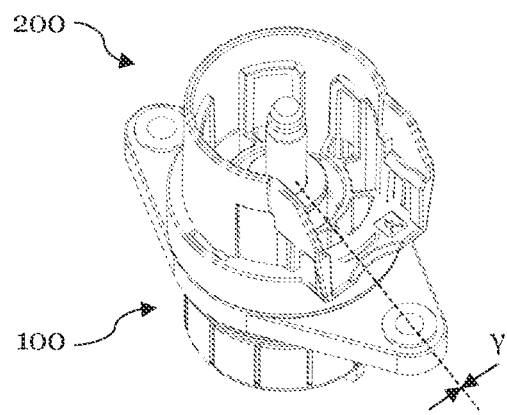
FIG. 5A schematically shows the rotatable interface assembly of FIG. 2 in a first angular orientation in accordance with an embodiment.
Figure 5B:
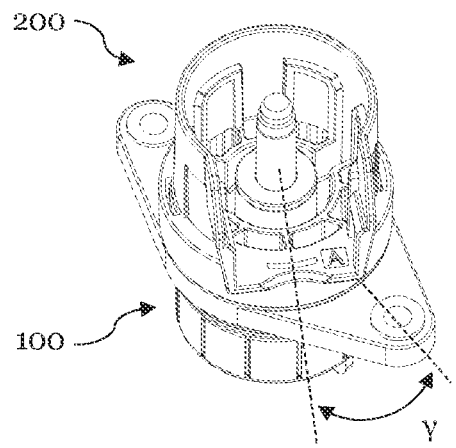
FIG. 5B schematically shows the rotatable interface assembly of FIG. 2 in a second angular orientation in accordance with an embodiment.
Figure 5C:
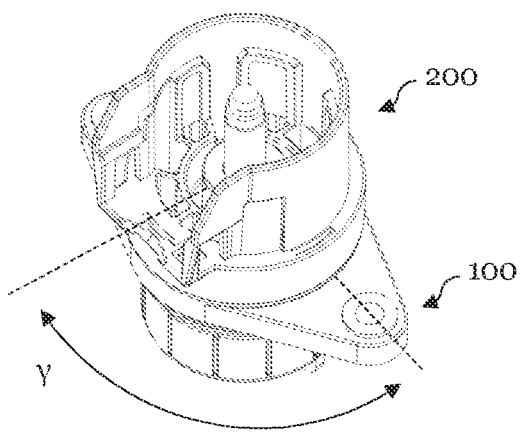
FIG. 5C schematically shows the rotatable interface assembly of FIG. 2 in a third angular orientation in accordance with an embodiment.

FIGS. 5A to 5C show the rotatable interface assembly 10 under different angular orientations, indicated by angle γ. In the view of FIG. 5A the base part 100 and the rotatable part 200 are aligned and angle γ equals 0°. In the view of FIG. 5B the rotatable part 200 is rotated around the rotational axis, relative to the base part 100, resulting in an angle γ that equals 60°. In the view of FIG. 5C the rotatable part 200 is rotated further, resulting in an angle γ that equals 95°. Accordingly, the rotatable part 200 can be rotated around the rotational axis in a desired angular orientation that matches an orientation of the corresponding counter connector, so as to allow to receive the corresponding counter connector under different angular orientations, relative to the base part 100.

Figure 6A:
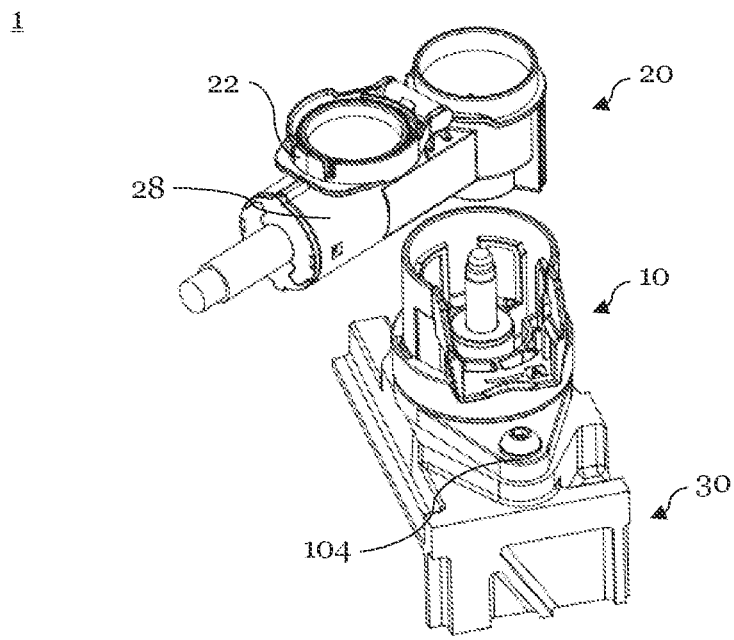
FIG. 6A schematically shows an electrical connector system in accordance with an embodiment.

FIG. 6A shows an electrical connector system 1, comprising an electrical connector assembly 10, as described above with respect to FIGS. 1 to 5C. Further, the electrical connector system 1 comprises a corresponding counter connector 20. The corresponding counter connector 20 is configured to be received at least partially within the rotatable part 200 of the rotatable interface assembly of the rotatable interface assembly 10, to couple with the rotatable interface assembly 10. The rotatable interface assembly 10 is secured by the through hole 104 to a counterpart 30.

Figure 6B:
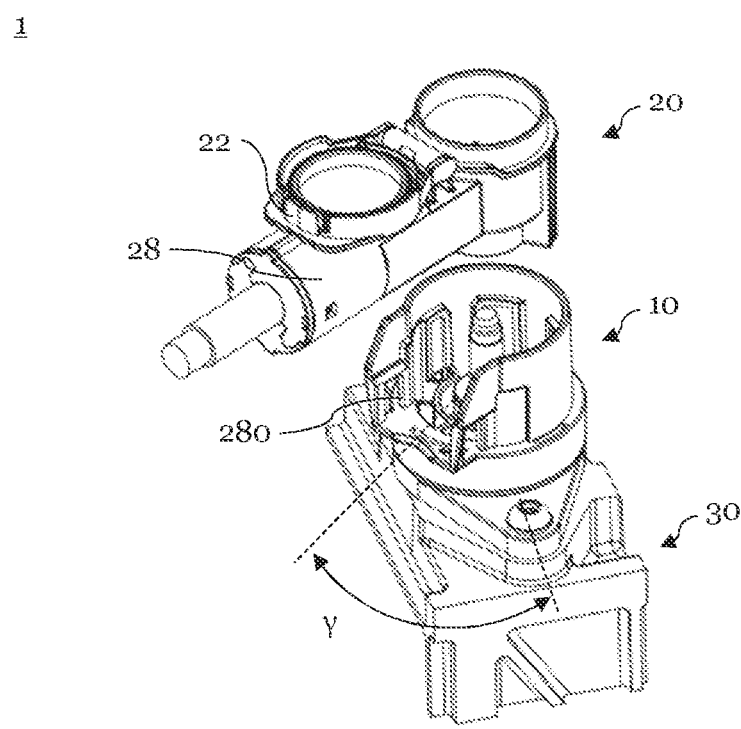
FIG. 6B schematically shows the electrical connector system of FIG. 6A, wherein the rotatable part is in the desired angular orientation in accordance with an embodiment.
Figure 6C:
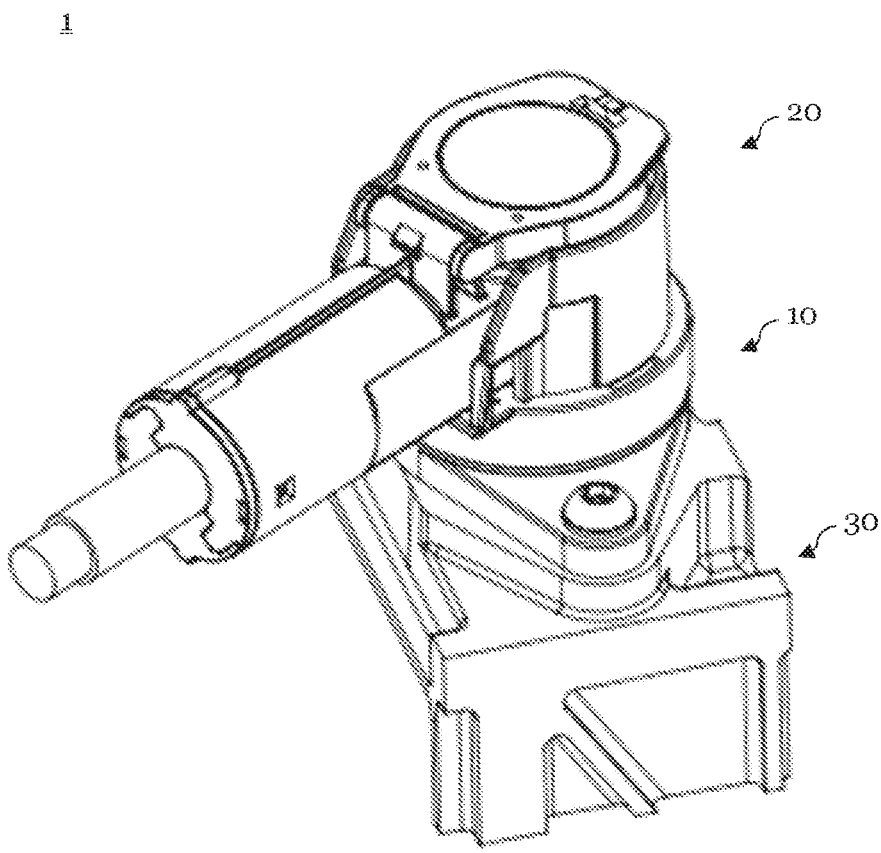
FIG. 6C schematically shows the electrical connector system of FIG. 6A in a coupled state in accordance with an embodiment.

In FIG. 6A, the corresponding counter connector 20 has an orientation that does not match with the angular orientation of the rotatable part 200. Accordingly, the corresponding counter connector 20 cannot be received, also not partially, within the rotatable part 200. To bring the rotatable part 200 in an angular orientation that matches the orientation of the corresponding counter connector 20 (desired angular orientation) the rotatable part 200 can be rotated around the rotational axis in the desired angular orientation, as shown in FIG. 6B. If the orientation of the corresponding counter connector 20 matches the angular orientation of the rotatable part 200, the corresponding counter connector 20 can be coupled to the rotatable interface assembly 10. In this orientation, a housing portion 28 of the corresponding counter connector 20 is aligned with the lateral opening 280 of the rotatable part 200 and the rotatable part 200 can receive the corresponding counter connector 20 at least partially. The lateral opening 280 will guide the housing portion 28 of the corresponding counter connector 20, when the corresponding counter connector 20 is coupled to the rotatable interface assembly 10 as shown in FIG. 6C.

For securing the coupling between the rotatable interface assembly 10 and the corresponding counter connector 20, the rotatable interface assembly 10 may further comprise a coupling means (not shown) that is engageable with a corresponding coupling means 22 provided on the corresponding counter connector 20.

Figure 7:
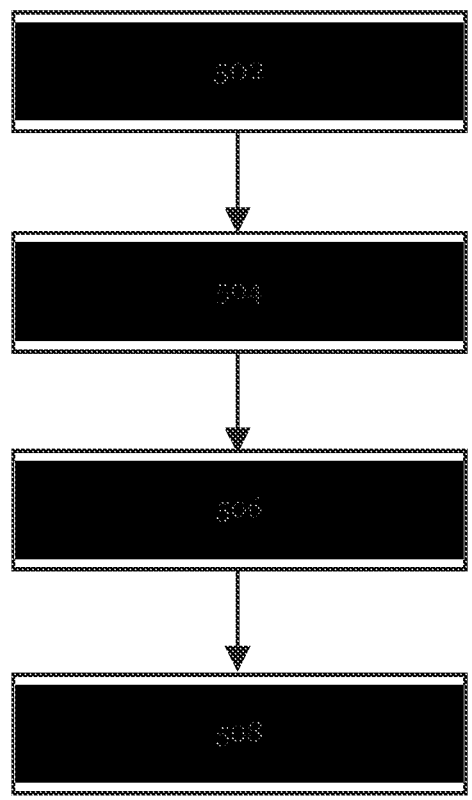
FIG. 7 is a schematic flow chart of a method for coupling a connector system in accordance with an embodiment.

FIG. 7 is a schematic flow chart of a method 500 for coupling a connector system 1. The method 500 comprises the steps of:
providing 502 an electrical connector;
providing 504 a corresponding counter connector 20;
rotating 506 the rotatable part 200 of the rotatable interface assembly of the electrical connector, to be in a desired angular orientation that matches the orientation of the corresponding counter connector 20; and
coupling 508 the corresponding counter connector 20 with the electrical connector.

The invention claimed is:

1. A rotatable interface assembly for an electrical connector, comprising:
a base part at least partially housing a connector having at least one electrical contact configured to electrically connect electrical elements via a corresponding counter connector, wherein the base part comprises at least one securing means for being secured to a fixed counterpart and wherein an interior circumferential surface of the base part comprises multiple locking grooves being circumferentially equally distributed on the interior circumferential surface, and
a rotatable part, being configured to receive the corresponding counter connector at least partially under a specific angular orientation, wherein the rotatable part is arranged on the base part and rotatable around a rotational axis relative to the base part and wherein an exterior surface of the rotatable part comprises at least one flexible locking element that is configured to engage with at least one of the multiple locking grooves to releasably lock the rotatable part in the desired angular relative to the base part.

2. The assembly according to claim 1, wherein the rotatable part can be rotated 360° around the rotational axis in equal angular increments and wherein the rotation can be clockwise or counterclockwise.

3. The assembly according to claim 2, wherein the rotatable part can be rotated around the rotational axis in 15° increments and wherein the rotation can be clockwise or counterclockwise.

4. The assembly according to claim 1, wherein the at least one flexible locking element comprises at least one corresponding latching element and wherein the at least one latching element is configured to latch with a corresponding at least one of the multiple locking grooves to secure the rotatable part on the base part in an axial direction of the rotational axis.

5. The assembly according to claim 4, wherein the at least one latching element is a latching protrusion extending radially outward.

6. The assembly according to claim 5, wherein the latching protrusion is formed as a circumferential edge portion on an outer circumferential surface of the base part.

7. The assembly according to claim 6, wherein the circumferential edge portion surrounds the base part completely.

8. The assembly according to claim 4, wherein the at least one corresponding latching element extends radially inward from an inner circumferential surface of the rotatable part.

9. The assembly according to claim 4, wherein the at least one corresponding latching element is formed as a latching nose.

10. The assembly according to claim 4, wherein the rotatable part comprises multiple corresponding latching elements.

11. The assembly according to claim 10, wherein the multiple corresponding latching elements are equally distributed circumferentially.

12. The assembly according to claim 10, wherein the rotatable part comprises at least four corresponding latching elements.

13. The assembly according to claim 1, wherein the rotatable part comprises multiple locking elements, being circumferentially distributed on the rotatable part, and wherein the base part comprises at least one flexible locking element that is configured to engage with at least one of the multiple locking elements, for releasably locking the rotatable part in a desired angular orientation, relative to the base part.

14. The assembly according to claim 13, wherein the multiple locking elements are provided as locking grooves, being substantially parallel to the rotational axis, and wherein the at least one flexible locking element optionally is provided as a corresponding at least one locking rib.

15. The assembly according to claim 13, wherein the base part or the rotatable part comprises at least three corresponding flexible locking elements and preferably at least five flexible locking elements.

16. The assembly according to claim 13, wherein the base part or the rotatable part comprises at least six locking elements and wherein the locking elements being equally circumferentially distributed on the base part or the rotatable part.

17. The assembly according to claim 1, wherein the base part comprises a guiding surface, and wherein the rotatable part comprises a corresponding guiding surface, the corresponding guiding surface being configured to slide along the guiding surface upon rotational movement of the rotatable part to support the rotational movement of the rotatable part.

18. The assembly according to claim 1, further comprising a sealing member for sealing the rotatable interface assembly, against the corresponding counter connector when being coupled to the corresponding counter connector.

19. The assembly according to claim 1, further comprising a coupling means for coupling a corresponding counter connector to the rotatable interface assembly by means of a corresponding coupling means provided on the corresponding counter connector and wherein the coupling means is arranged on the rotatable part.

20. The assembly according to claim 1, wherein the rotatable part is configured to be rotated around the rotational axis in a desired angular orientation that matches an orientation of the corresponding counter connector, so as to allow the connector to receive the corresponding counter connector under different angular orientations relative to the base part.

21. A method for coupling a connector system, comprising:

providing an electrical connector including a rotatable interface assembly for an electrical connector having a base part at least partially housing a connector having at least one electrical contact configured to electrically connect electrical elements via a corresponding counter connector, wherein the base part comprises at least one securing means for being secured to a fixed counterpart and wherein an interior circumferential surface of the base part comprises multiple locking grooves being circumferentially equally distributed on the interior circumferential surface, the rotatable interface assembly further having a rotatable part, being configured to receive the corresponding counter connector at least partially under a specific angular orientation, wherein the rotatable part is arranged on the base part and rotatable around a rotational axis relative to the base, wherein an exterior surface of the rotatable part comprises at least one flexible locking element that is configured to engage with at least one of the multiple locking grooves;

providing the corresponding counter connector;

rotating the rotatable part of the rotatable interface assembly of the electrical connector to be in a desired angular orientation that matches the orientation of the corresponding counter connector, and coupling the corresponding counter connector with the electrical connector.

* * * * *